Oct. 15, 1940.   G. P. GRIGSBY   2,218,106
CEMENT CARRIER FOR TRUCKS
Filed Dec. 23, 1939   2 Sheets-Sheet 1
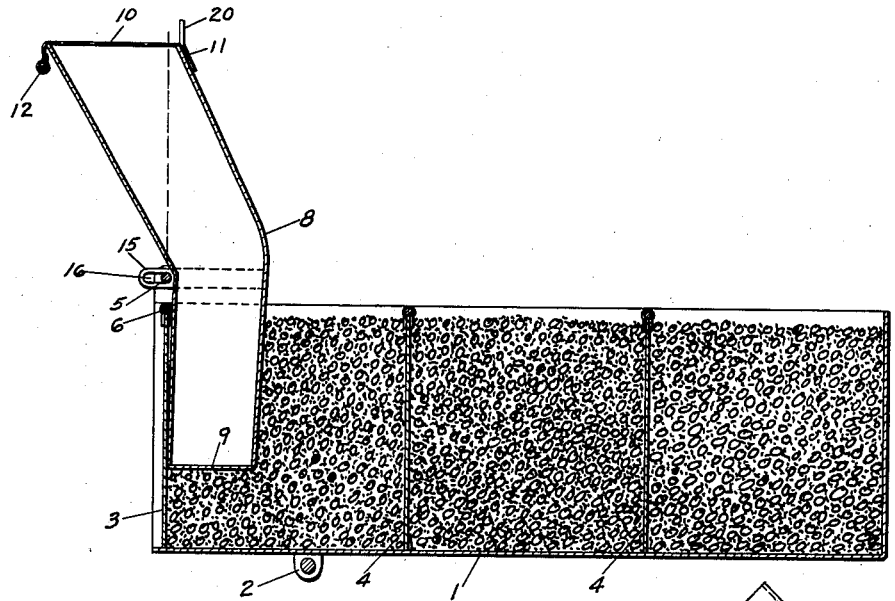
Fig. I
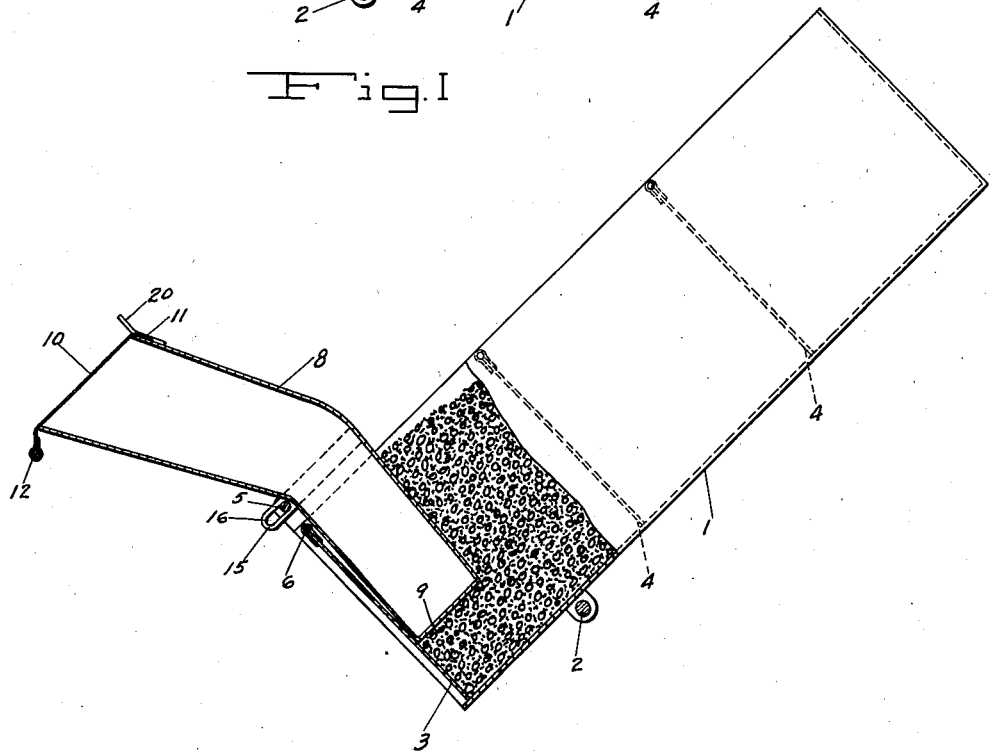
Fig. II
INVENTOR
GEORGE P. GRIGSBY
BY G. F. McDougall
ATTORNEY

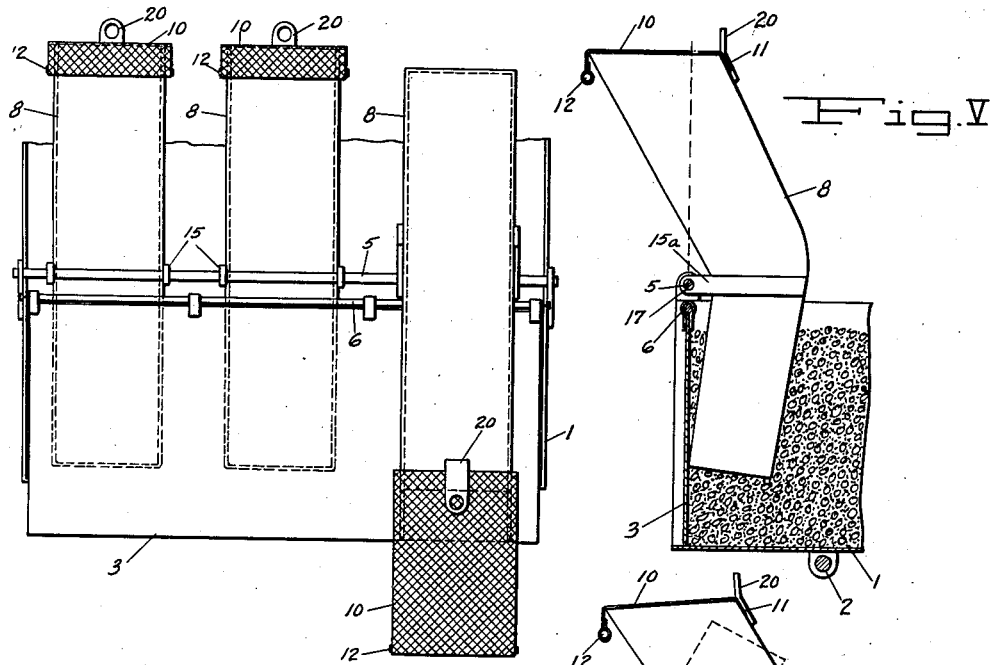
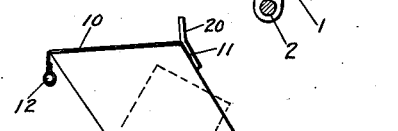
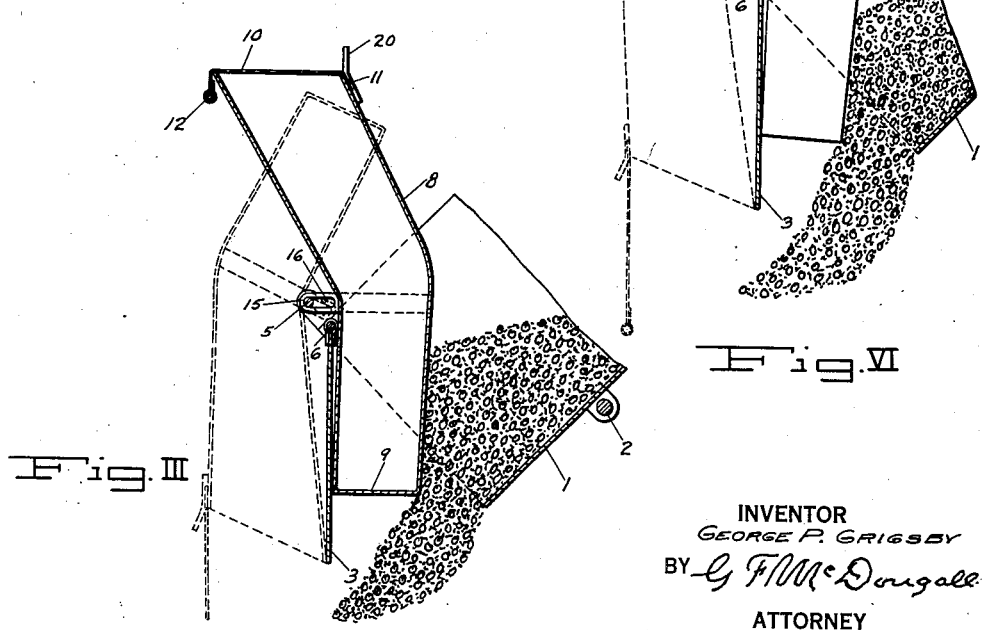

Patented Oct. 15, 1940

2,218,106

UNITED STATES PATENT OFFICE 2,218,106

CEMENT CARRIER FOR TRUCKS

George P. Grigsby, Portland, Oreg.

Application December 23, 1939, Serial No. 310,749

6 Claims. (Cl. 298—8)

This invention relates to an improved cement carrier for aggregate trucks.

For reasons of economy resultant from utilization of bulk cement and in the interest of uniformity, the aggregate truck with separate cement container has achieved an important place in the construction art.

The aggregate truck, referring to the body, is of the "dump" style, where a hydraulic lift raises the front end. The body is divided into several measured compartments, the rearward of which has a swinging end gate and the others swinging intermediate gates, suitably controlled. It is common to hang a cement carrier on the inside of each gate to carry the correct amount of Portland cement required to make the contents of that compartment into cement concrete by mixing with water. The carrier is an elongated rectangular box-like structure, open at the bottom, with a closable top.

After filling the body compartment with wet sand and gravel in correct proportions, the same flowed under the carrier, closing the bottom, then a few shovels of dry sand in the carrier protected the cement for a haul of reasonable length. When the body was raised and the swinging gate opened, the cement and aggregate were both discharged. The foregoing is the structure improved by the present invention.

An object of the invention is better distribution of the cement over the aggregate, as it tended to bunch in delivery. In the case of the second and third compartment is stuck to the wet metal floor of the body, not being cleanly dislodged by the aggregate flowing over it.

Another object is better protection of the cement to save the necessity of using a truck load arriving late on the job, with overtime work, as the hygroscopic quality of Portland cement will wet through the sand in a few hours.

Another object is a cement carrier that normally dumps its contents squarely on the top of the pile of aggregate first dumped, since a far better distribution is the result.

The foregoing and other objects that will be at once apparent to those familiar with the use of such equipment, are achieved by the structure shown in the drawings accompanying this specification, and described therein, as the best form now known though the detailed description is not intended to mark the limits of the invention. For this, the art is referred to the claims following the descriptive portion hereof.

The drawings are in six figures, of which—

Fig. I is a sectional side view of a three section dump body, elevating means omitted, with the structure of the invention also in section;

Fig. II is the same structure shown in Fig. I except that the body has been raised to dumping position;

Fig. III is a view of the structure in Fig. II, with the end gate open, the aggregate dumping and the carrier undumped. The position it will occupy when dumped is shown in dotted outline;

Fig. IV is an end view of the structure shown in Fig. II, one cement carrier being dumped, the other two being held for the remaining sections when dumped;

Fig. V shows the structure of Fig. VI in its riding position;

Fig. VI is a view showing the different hinge suspension in Fig. V as hereinafter explained; the end gate is open, the aggregate being discharged and the carrier not dumped. In dotted outline the carrier position, dumped, is indicated.

In the drawings, 1 is the dump body of a dump truck; 2 is a dump mounting which diagrammatically indicates means for raising and lowering the body 1 as may be required; 3 is an end gate and 4 represents intermediate gates disposed as may be desired. Means for closing and locking the gates 3 and 4 will always be present but are omitted from the drawings as they are well understood. The end gate is hingedly connected to the end of the body 1 at 6.

A carrier support 5 is made rigid with the body 1 just above the hinge member 6, preferably in vertical alignment when the body 1 is down.

The carrier 8 is a container member, preferably of rectangular section and is best when made with its vertical axis bent as shown in all of the figures so that the top part of it will overhang the end gate 3 as this makes for much easier dumping and does not impair its stability.

The carrier 8 is provided with a water tight bottom member 9, preferably welded in place, and a closable cover 10 which is attached to the front side of the top at 11. It preferably consists of a piece of heavy canvas, somewhat wider than the top of the carrier 8, being kept in place by the metal rod 12 which serves as a weight to keep it closed when upright, the canvas preventing spraying of the cement when it is dumped, as indicated in Figs. III and VI.

The structure of Fig. V includes a plain lug 15a, that is provided with a round hole 17 that fits the carrier support 5, instead of the lug 15, with the lost motion loop 16, shown in the other figures. As will be noted, the hang of the carrier 8 with respect to the end gate 3 is well on one side for stability in traveling.

It is believed that the stability of the carrier fitted with the lost motion loop 16 is at least equal to that shown in Fig. V, and it dumps easier. Also it lies better on the end gate. It will be noted from the dotted vertical lines in Figs. I and V that the actual center of gravity of a loaded carrier is much the same and well on the side of stability.

It will also be noted that with the structure of Fig. V, when the operative hooks his pikepole into the loop 20, he must do some lifting of the load to pull it over. Since the carrier will have cement of the order of 500 pounds in it, this is important.

When the lost motion loop is used, about the first result of a pull on the loop 20 will be to slide the carrier over closer to the point of support 5, changing the relationship of the center of gravity, to advantage.

It is at once apparent that my new carrier permits the dumping of a pile of aggregates, into a pile with tapered sides, then dumping the cement squarely on top of the aggregates, which is far superior to the old style which tended to leave the cement in a body in one place within the aggregate.

Having disclosed my invention and the principle of its operation so that those familiar with hauling equipment will be able to make the best use of it that I now know, what I claim as new and desire to secure by Letters Patent, is:

1. A cement carrier for a dump truck, comprising in combination a swinging gate member, a closed bottom cement carrier on the inside of said gate member that projects above and partially overhangs said gate the said carrier being axially bent intermediate its ends, and means for hingedly attaching the carrier at a point immediately above the end gate with the inwardly bent side of the carrier adjacent the gate whereby the carrier may be upended and dump its contents over the top of the gate.

2. A cement carrier for a dump truck, comprising an elongated metal container, a solidly closed bottom member, a closable top member and a hinge member within the middle part of the carrier on one side thereof, characterized by the said hinge member being connectable to a point above the end gate of a truck with a substantial portion of its length projecting thereabove and turnable on the hinge to dump its contents over the gate.

3. A cement carrier for a dump truck, comprising an elongated metal container, a solidly closed bottom member, a closable top member and a hinge member intermediate the ends of the carrier on one side thereof, characterized by the said hinge member being connectable to a point above the end gate of a truck with a substantial portion of its length projecting thereabove and partly overhanging the gate, being turnable on the hinge to dump its contents over the top of the gate.

4. In a cement carrier of the character described, a carrier member, a hinge suspension therefor a part of which is made rigid with the carrier intermediate its length, said part attached to the carrier being characterized by a lost motion loop that is effective to move the center of gravity of the carrier with respect to the hinge under the influence of load and to change it back again under the influence of pull on the top of the carrier when the same is dumped.

5. A cement carrier for a truck, comprising an elongated container portion, a fixed bottom member and a closable cover, the said carrier container portion being bent in the central portion without diminishing its cross-section, and a hinge support one part of which is made rigid with said container at the inward side of the bend, the other part being attachable to a truck body above an end gate thereof in such manner as to support the container within the body so that the container may be easily overbalanced to dump its contents over the top of the end gate.

6. A cement carrier for a truck that is adapted for mounting on a hinge support above the truck body end gate, comprising an elongated container portion, a fixed bottom therein, a closable top member and a hinge lug made rigid with the container on one side thereof intermediate the ends, the said hinge lug being adapted for connection to a stationary part above the truck body end gate in such manner that the container may be partly revolved about such stationary part to upend it and dump its contents over the end gate.

GEORGE P. GRIGSBY.